United States Patent [19]

Hoffman et al.

[11] 3,961,226

[45] June 1, 1976

[54] MULTI-TERMINAL ARRESTOR HOLDER AND CONNECTOR MODULE

[75] Inventors: Bruce E. Hoffman; S. Thomas Berkley, both of Raleigh, N.C.

[73] Assignee: International Telephone and Telegraph Corporation, Nutley, N.J.

[22] Filed: Sept. 5, 1974

[21] Appl. No.: 503,403

[52] U.S. Cl. .................................. 317/61.5; 317/62; 339/111; 317/120; 174/51

[51] Int. Cl.[2] .............................................. H02H 3/22

[58] Field of Search ................ 317/61.5, 62, 69, 61, 317/99, 120; 339/111, 75 A, 192 R; 315/299, 301; 313/DIG. 5; 337/32, 33, 34; 174/51

[56] References Cited

UNITED STATES PATENTS

| | | | |
|---|---|---|---|
| 3,733,522 | 5/1973 | Simovits, Jr. et al. | 339/111 |
| 3,748,521 | 7/1973 | Wright et al. | 317/69 |
| 3,851,220 | 11/1974 | Charles | 317/61.5 |

*Primary Examiner*—J D Miller
*Assistant Examiner*—Patrick R. Salce
*Attorney, Agent, or Firm*—John T. O'Halloran; Menotti J. Lombardi, Jr.; Richard A. Menelly

[57] ABSTRACT

A multi-terminal arrestor holder and connector module provides electrical connection between telephone lines and telephone repeaters by means of a single body module which houses one three-electrode gas tube lightning protector for each pair of telephone lines. Lightning protection is accomplished by ionization occurring between either of two electrodes and a grounded intermediate electrode. Replacement of the arrestors and repeaters is conveniently provided by the spring clip mounting arrangement integrally formed within the arrestor module so that damaged arrestors can be readily removed without interrupting telephone service.

11 Claims, 4 Drawing Figures

MULTI-TERMINAL ARRESTOR HOLDER AND CONNECTOR MODULE

BACKGROUND OF THE INVENTION

Whenever sensitive electronic equipment is connected to an outdoor cable steps must be taken to insure that voltage transients caused by lightning and utility power systems do not damage the equipment. Telephone equipment and instrumentation are particularly prone to damage from voltage surges due to the large number of interconnecting and exposed telephone lines in operation. The telephone signal from a telephone handset in propagation along the connecting telephone lines becomes attenuated with distance and requires some means of electrical amplification in order to assure that the signal will reach its destination. A common method for amplifying telephone signals involves the use of a large number of telephone repeaters in a sealed exterior mounted repeater housing. A large number of incoming telephone lines can therefore be connected to the repeaters for amplification. Telephone repeater design has progressed from simple electromagnetic devices to sophisticated and miniaturized semiconductor components and circuits. The repeaters currently employed are sensitive to the current and voltage surges that frequently occur along the telephone line extent.

Along with the development of semiconductor repeaters a corresponding development has occurred in the state-of-the-art of voltage surge protective devices. Earlier protective devices connected between the telephone line and the telephone repeaters consisted primarily of carbon block devices which provided a ground path for large voltage surges and thereby prevented the voltage surges from damaging the repeaters. The problems inherent within the carbon block protector led to the development of gas-filled voltage surge protectors. In an earlier application, one of the electrodes of the gas tube was connected to one of the telephone lines before coupling with one of the repeater terminals, while the other gas tube electrode was connected to ground. In operation the telephone signals could readily transfer to the repeater since the gas tube performed like an open circuit to ground as the voltages developed in ordinary telephone communication signals were much lower than the ionization voltage required to ignite the gas tube. However, when a large voltage became impressed upon the telephone line the voltage between the tube terminal and ground, in excess of the ionization voltage for the tube, summarily caused the tube to become conductive and a short circuit discharge path was therefore established between the telephone line and ground via the electrode to ground connection through the tube. The dissipation of the abnormal voltage surge through the tube therefore protects the repeater from becoming subjected to voltages much higher than the design consideration for the repeater operation.

One of the early problems in the use of high voltage arrestors for repeater protection was the remoteness between the assembly of repeaters and the location of the protective device. In cases, for example, where the arrestor became damaged and failed to protect the corresponding electrically connected repeater, and where the repeater became damaged as a result of the aforementioned voltage surge, it was very difficult to determine which of the many voltage arrestors had failed, and which of the many separately located repeaters was associated with the defective voltage surge arrestor.

The subsequent method of arranging both the telephone repeaters and the protective high voltage surge arrestors within the same housing provided a great convenience to the telephone repairman when problems occurred. Test procedures were developed for locating and identifying both the damaged repeater and the defective arrestor so that repairs and replacement could be made within a reasonable period of time.

The methods currently employed in wiring repeater housings however require separate assemblies for the voltage surge arrestors, the repeaters, and the interconnecting wiring connection subassembly. The use of the interconnecting subassembly between the arrestors and repeaters is required since a separate arrestor is required for connecting between each input terminal of the same repeater. Since two telephone lines are required for ordinary telephone communication purposes, two two-electrode voltage arrestors must be connected in common with the input repeater terminals and two two-electrode voltage arrestors must be connected to the repeater output terminals. This is to insure that the repeater is protected at both its input and output stages since voltage surges could possibly occur on both the input terminal connecting telephone lines and the output terminal connecting telephone lines. The advent of the three-electrode gas-tube voltage surge arrestor, where a third electrode is inserted between the two primary electrodes, reduced the actual number of voltage arrestors from four per repeater to two. The center electrode, by connection to ground, provided an escape path for voltage surges which would occur on either of the two main electrodes. The use of the three-electrode voltage arrestor also greatly reduced the amount of wiring and expense required within the telephone repeater housing.

One problem involved in state-of-the-art voltage arrestor applications is the requirement for a separate wiring subassembly for connecting the telephone wires to the voltage arrestors and to the repeaters. The use of a separate voltage arrestor assembly, a separate repeater assembly, and a separate connector subassembly requires a good deal of valuable space and time for interconnecting between the voltage arrestor assembly and the connector subassembly, between the connector subassembly and the repeater input terminals, between the repeater output terminals and the connector subassembly and between the connector subassembly and the voltage arrestor assembly.

This invention therefore discloses a multi-terminal voltage surge protection device which provides for direct connection between the telephone lines and telephone repeaters and allows complete voltage surge protection without the necessity for a subassembly connector, and also provides for rapid access to the repeaters and arrestors for inspection, removal and repair.

SUMMARY OF THE INVENTION

A molded plastic module has electrical contact pins integrally formed therethrough with one end of the contact pins on one side of the module for interconnecting with the repeater printed circuit board, and with the other end of the connector pins extending from an opposite side of the module for connecting to the telephone lines. The module has spring clips integrally formed therein to provide both mechanical support and electrical connection for gas tube three-electrode voltage surge protectors. The middle electrode of the protector contacts a spring-loaded ground contact finger so that one tube provides protection to a pair of telephone lines. The module has a series of corresponding recesses within the module base subjacent to the spring clips to provide easy removal of the protector and to provide further support to the protector when mounted on the module.

One of the objects of the multi-terminal module is to provide rapid interconnection between the voltage surge arrestors and the printed circuit board containing the telephone repeaters. This is assured by means of the male/female interconnecting relationship between the receptacle pins on the module and the connecting pins on the telephone repeater printed board assembly.

A further object of the inventive multi-terminal voltage surge arrestor module is to provide ready access to the voltage surge arrestors for determining whether any of the arrestors are non-functional and for convenient removal and replacement without disconnecting or interfering with telephone service.

Other objects of this invention are to provide rapid connection between telephone lines and telephone repeater assemblies, and to provide voltage surge protection to the telephone repeaters without having to provide a separate connection subassembly for electrical connection between the telephone lines, the connector subassembly, the voltage surge arrestors and the repeaters.

DESCRIPTION OF THE PREFERRED EMBODIMENT

Figure 2:
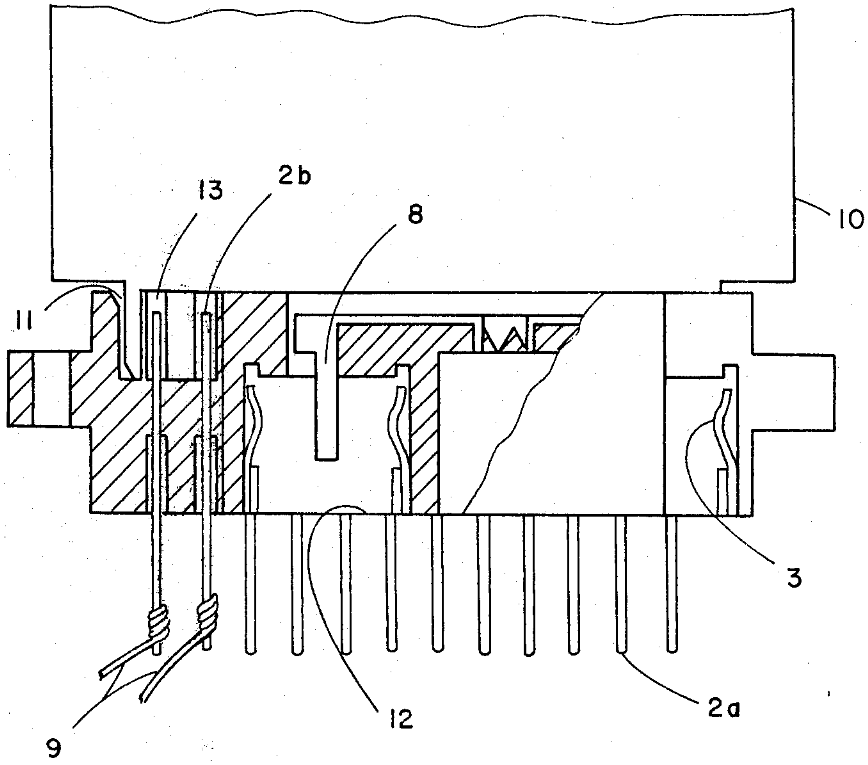
FIG. 2 is a side view of the module of FIG. 1 in partial section including telephone wire and printed circuit board connections therewith.
Figure 1:
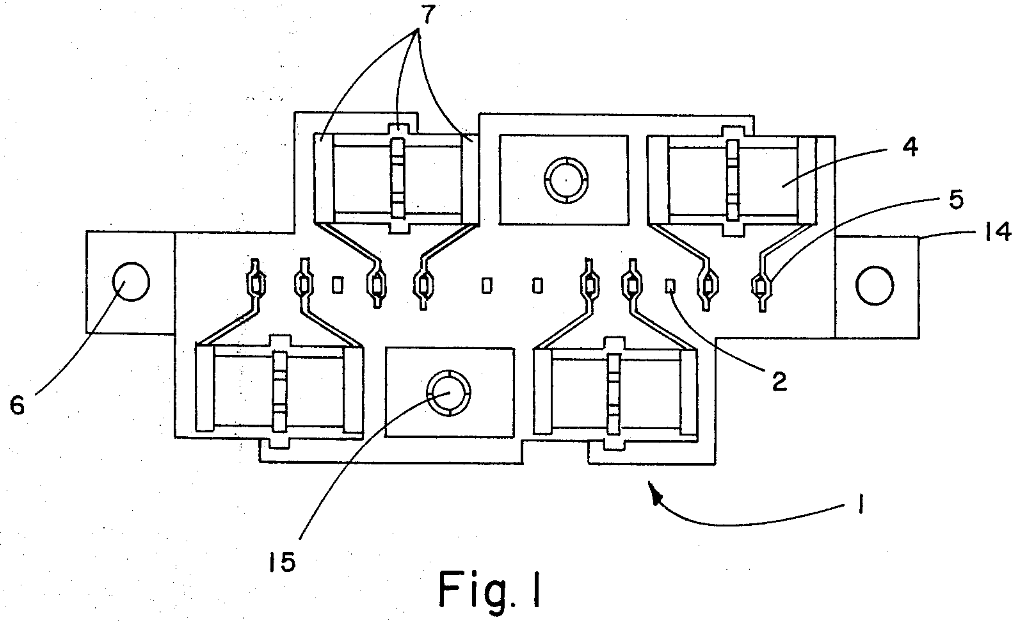
FIG. 1 is a top view of the multi-terminal module of this invention.

FIGS. 1 and 2 show one embodiment of the multi-terminal module of this invention. The module 1 was fabricated from a body 14 made from a glass-filled polyester resin and injection molded to have a length of roughly 2½ inches, a width of 1¼ inches and a thickness of approximately ¾ inch. Twelve durable copper alloy contact pins 2 gold plated to insure good electrical conductivity were cast integrally with the glass-filled polyester body 14. Four pairs of tin plated copper alloy gas tube contact springs 3 were press-fitted into corresponding insert slots within the body 14. For each pair of contact springs 3 there was also inserted into a suitable recess in the body 14 one ground arrestor contact 8 and positioned so that a type H3 Joslyn lightning arrestor tube 4, when press-fitted between the contact springs 3 two of the electrodes 7, would intimately contact the contact springs 3 and a third electrode 7 would intimately contact the ground arrestor contact 8. The material for molding the body 14 for the module 1 was chosen because of the good mechanical impact properties of the polyester resin and its high dielectric strength. The type H3 lightning arrestor tube 4 having a length of approximately ½ inch was particularly chosen in order to conveniently mount four such arrestors 4 within a single module 1. The arrestor 4 is a three-electrode 7 gas tube type which provides for electrical conductivity between either of the end electrodes 7 with the center electrode to ground when a voltage in excess of 350 volts occurs between either end electrode and the center electrode causing the gas within the tube to ionize and resulting in a dissipative conductive path from either end electrode to ground by means of the center electrode ground connection 8.

Figure 3:
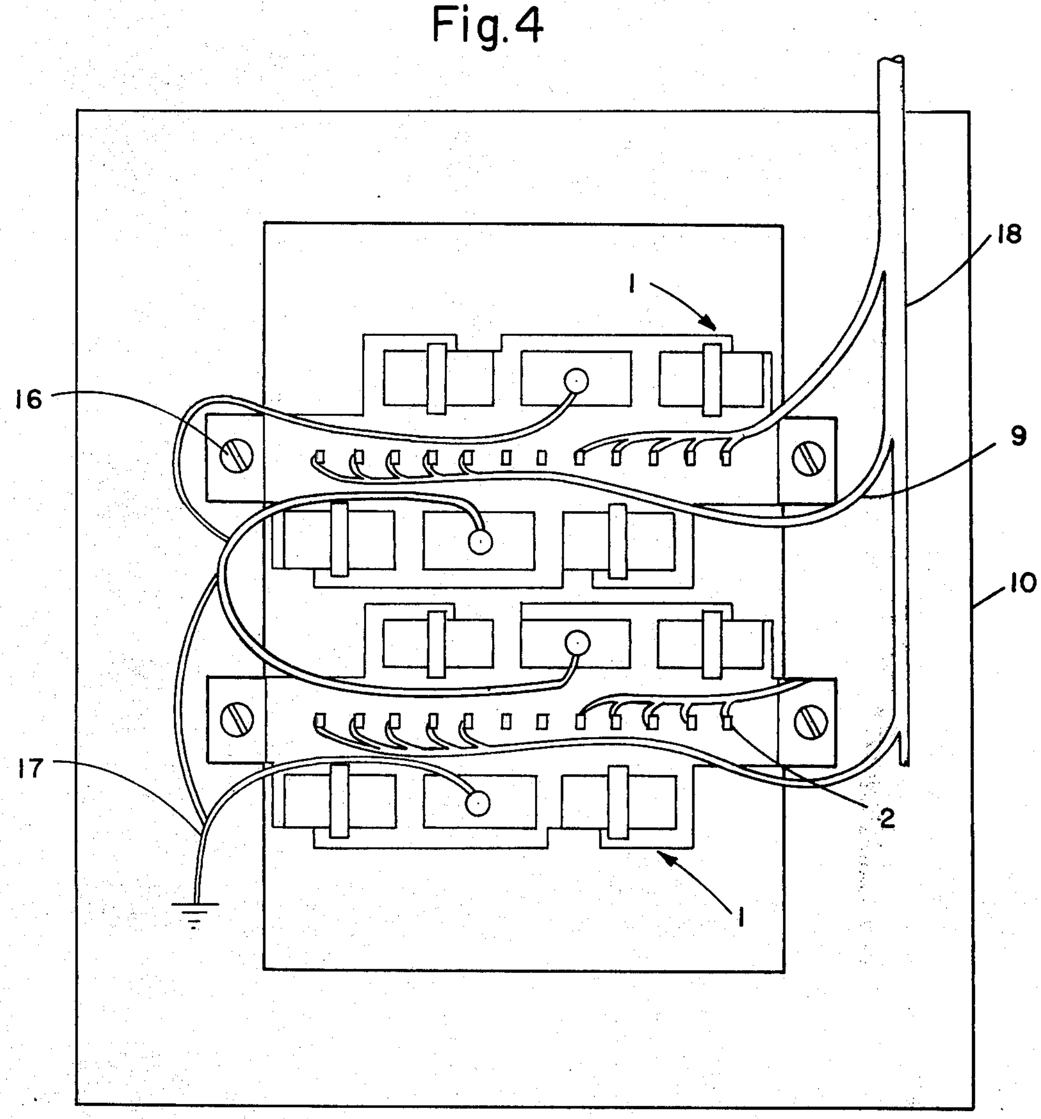
FIG. 3 is a top view of two of the modules of FIG. 1 attached to a repeater housing and connected both to telephone wires and to ground.

The exterior of the arrestor 4 is composed of a high dielectric strength ceramic insulating material to insure that ionization will occur interior to the tube. A pair of mounting holes 6 are integrally formed in the molding process of the body 14 in order to provide means for securing the module 1 to the repeater housing 10 and to insure that good electrical interconnection is provided between the printed circuit board contact pins 2b and the printed circuit board contacts 13 provided at one end of the printed circuit board 19 shown in FIG. 4. In order to provide electrical connection between the module 1 and ground a pair of ground contact terminal lugs 15 are formed integrally within the body 14. FIG. 3 shows the interconnection wire 17 between the ground-arrestor contacts 8 and the ground contact terminal 15. Although this is specifically shown as a wire connection circuit this connection can be made by standard thick film techniques and a wire is shown here for purposes of clarity only. Electrical connection between the arrestors 4 and the contact pins 2 is provided by means of a number of contact clips 5 connected to each contact pin 2. The contact clips 5 are tightly secured to the contact pins 2 by slidingly engaging with them. This assures that a minimum electrical contact resistance will occur between the contact pins 2 and the arrestors 4.

Referring again to FIG. 2 connection between the repeater and the telephone wires 9 is made by attaching module 1 to the repeater printed circuit board 10 by pressing the printed circuit board contact pins **2*b* onto the printed circuit board contacts 13. Recess 11 is integrally formed in the module body 14 to assure good physical contact between the module 1 and the repeater printed circuit board 10.**

Figure 4:
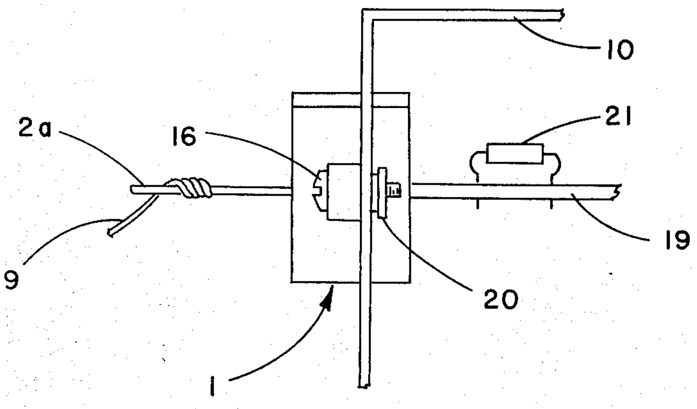
FIG. 4 is an end view of the module of FIG. 1 connected to a repeater housing with part of the repeater housing removed to show the circuit board assembly therein.

FIG. 4 shows the module 1 connected to the housing 10 and lockingly secured by means of connecting screws 16 and nuts 20. Once the module is secured to the repeater housing the telephone wires 9 are then attached to the telephone wire contact pins **2*a* extending from the module 1. Printed circuit board 19 carries the active components of two telephone repeaters and also includes other electronic circuit elements such as diode 21.**

Since the repeater housing contains a large number of telephone repeaters several modules 1 are employed in a typical installation. Once the module 1 has been fixedly secured to the repeater housing 10 by means of the connecting screws 16 as shown in FIG. 3 and ground wire connections 17 have been made, the telephone wires 9 from the input telephone cable 18 can then be secured to the contact pins 2 by conventional wire wrap techniques.

In case of a repeater failure, by means of a defective or damaged arrestor, for example, the arrestor can be located and identified as damaged by the characteristic dark discoloration which occurs to the damaged arrestor exterior. The damaged arrestor can then be rapidly removed from its clip support and replaced without disconnecting or interrupting telephone service. Since the telephone repeaters are also press-fitted into a printed circuit board assembly the defective or damaged repeater can be removed and replaced with very little loss of time.

The multi-terminal module of this invention finds application whenever sensitive electronic equipment and apparatus must be connected to exterior electrical connectors. In all cases of such transistion from exterior exposed wiring to interior sensitive electronic apparatus auxiliary protection must be provided in order to assure that electrical surges in excess of the safe operating ratings of the electronic apparatus are prevented from contacting and damaging the equipment. This module therefore provides convenient protection against voltage surges for several applications including the interconnection between electronic apparatus and exterior exposed wiring and in no way is limited to telephone communication assemblies.

While we have described above the principles of our invention in connection with specific apparatus it is to be clearly understood that this description is made only by way of example and not as a limitation to the scope of our invention as set forth in the objects thereof and in the accompanying claims.

What is claimed is:

1. A multi-terminal holder for high voltage surge arrestors and printed circuit boards comprising:
- a base member;
- a plurality of electrical contact members extending through said base member for providing electrical contact to a circuit board;
- a plurality of contact means within said base member for retaining a plurality of voltage surge arrestors and for providing electrical contact between said voltage surge arrestors and said electrical contact members in connection therewith; and
- a plurality of ground-arrestor contact means within said base member for removably retaining and electrically connecting said arrestors to a ground terminal in connection therewith;
  - whereby each of said arrestors makes simultaneous electrical connection between a pair of said contact means and an associated ground-arrestor means when each of said arrestors is individually inserted between said pair of contact means.

2. The multi-terminal holder module of claim 1 wherein said electrical contact members extend parallelly adjacent to each other and perpendicular to a first side of said base member for providing terminal connection to a corresponding plurality of input cable wires, and said contact members are parallelly adjacent each other and extend perpendicular to a second side of said base member for providing electrical connection between each of said circuit boards and said holder when said contact members on said second side are coupled with complementary arranged male connectors provided on said circuit board.

3. The multi-terminal holder module of claim 1 wherein said ground-arrestor contact means become removably connected between said arrestors and ground when said arrestors are inserted in said contact means and said ground terminal is electrically connected to ground.

4. The multi-terminal holder module of claim 1 wherein said base further includes a plurality of cavities therein subjacent said contact means for providing a recess for each of said voltage surge arrestors when inserted in said contact means.

5. The multi-terminal holder module of claim 1 wherein said base member comprises an electrically insulating material and wherein said electrical contact members comprise a plurality of metal pins integrally contained within said material and extending therefrom one side.

6. The multi-terminal holder module of claim 1 wherein said voltage surge arrestors comprise a plurality of three-electrode gas discharge tubes wherein two of said electrodes are electrically coupled with two of said contact means and one of said electrodes is electrically and simultaneously coupled with said ground-arrestor contact means.

7. A multi-terminal holder for high voltage surge arrestors and printed circuit boards comprising:
- a base member;
- a plurality of electrical contact members extending through said base member for providing electrical contact to a circuit board;
- a plurality of contact means within said base member for retaining a plurality of voltage surge arrestors and for providing electrical contact between said voltage surge arrestors and said electrical contact members in connection therewith; and
- a plurality of ground-arrestor contact means within said base member for removably retaining and electrically connecting said arrestors to a ground terminal in connection therewith; said contact means comprising several pairs of operatively opposing spring contacts fixedly attached to said base for providing good mechanical and electrical connection for the arrestors when inserted therebetween each pair of contacts.

8. A multi-terminal holder for high voltage surge arrestors and printed circuit boards comprising:
- a base member;
- a plurality of electrical contact members extending through said base member for providing electrical contact to a circuit board;
- a plurality of contact means within said base member for retaining a plurality of voltage surge arrestors and for providing electrical contact between said voltage surge arrestors and said electrical contact members in connection therewith; and
- a plurality of ground-arrestor contact means within said base member for removably retaining and electrically connecting said arrestors to a ground terminal in connection therewith; said ground arrestor contact means comprising a spring member, having a contact fixedly attached to said base at one end and extending intermediate said contact means at the other end, and said other end electrically contacts said voltage surge arrestor by physical contact therewith when said arrestor is inserted in said contact means.

9. A multi-terminal holder for high voltage surge arrestors and printed circuit boards comprising:
- a base member;
- a plurality of electrical contact members extending through said base member for providing electrical contact to a circuit board;
- a plurality of contact means within said base member for retaining a plurality of voltage surge arrestors and for providing electrical contact between said voltage surge arrestors and said electrical contact members in connection therewith; and a plurality of ground-arrestor contact means within said base member for removably retaining and electrically connecting said arrestors to a ground terminal in connection therewith; said ground-arrestor contact means being electrically interconnected with each other and with at least one contact terminal for providing electrical connection to ground.

10. A multi-terminal high voltage surge arrestor module for connecting between telephone wires and telephone repeaters comprising in combination:

a molded plastic body having a set of 12 electric contact pins integrally extending therethrough, said contact pins projecting in a parallel arrangement from one side of said body for providing electrical connection with four pairs of said telephone wires, and said electrical contact pins recessed within another side of said body for providing electrical connection with one pair of said telephone repeaters;

four pairs of spring clip arrestor holders fixedly attached to said body at one end and electrically connected to eight of said electric contact pins;

said body having four recesses integrally formed therein, one said recess intermediately subjacent each of said pairs of spring clip arrestor holders for housing voltage surge arrestors when connected within said holders.

four electric contact fingers fixedly attached at one end to said body intermediate said spring clip arrestor holders one said electric contact finger per holder and electrically coupled together and to a ground connect terminal within said body for providing electrical connection between arrestors and ground; and four three-electrode gas tube voltage surge arrestors removably connected within said holders two of the electrodes of each said arrestor contacting two of said holders and one of said electrodes contacting said electric contact finger for providing electrical connection between said voltage arrestor and ground, and for providing electrical coupling between a first pair of said telephone wires, a first voltage arrestor, and one of said telephone repeaters when said repeaters are electrically connected to said contact pins whereby said repeater becomes protected from high voltage surges generated between said first pair of telephone wires by ionization of the gas within said arrestor and discharge of electricity between one of said electrodes and ground.

11. The multi-terminal high voltage surge arrestor module of claim 10 wherein a first arrestor is electrically connected between input terminals of a telephone repeater, and wherein a second arrestor is electrically connected between output terminals of the repeater, whereby said repeater becomes protected from voltage surges which occur when a first pair of telephone lines is connected to said input terminals, and said repeater becomes protected from voltage surges which occur when a second pair of telephone lines is connected between said output terminals.

* * * * *